P. J. MARKS.
PHOTOGRAPHIC SHUTTER.
APPLICATION FILED NOV. 30, 1915.

1,238,422.

Patented Aug. 28, 1917.
3 SHEETS—SHEET 1.

Witnesses

Inventor
Paul J. Marks

By his Attorneys

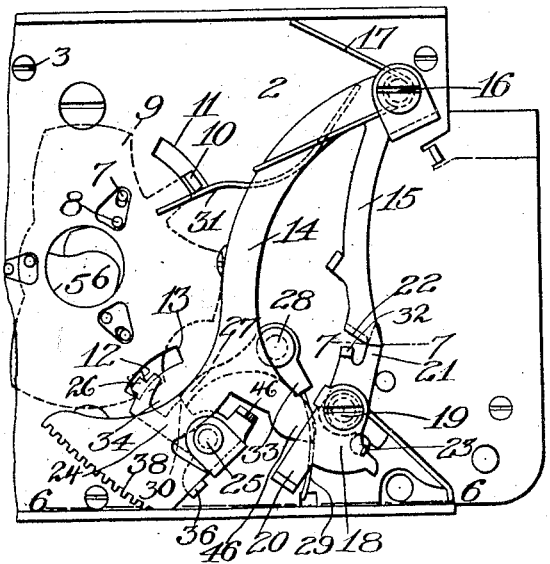
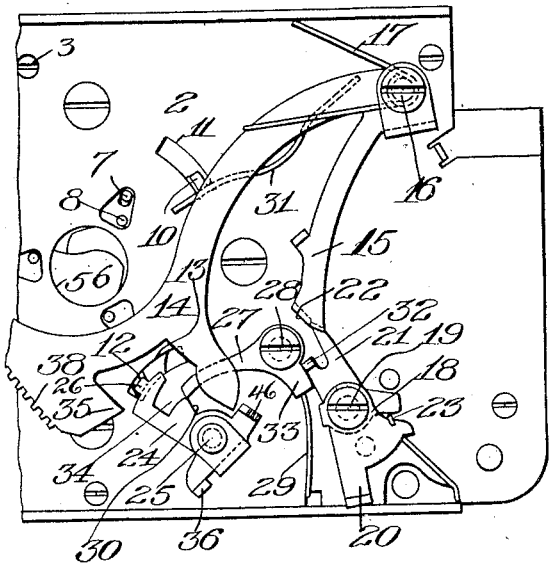
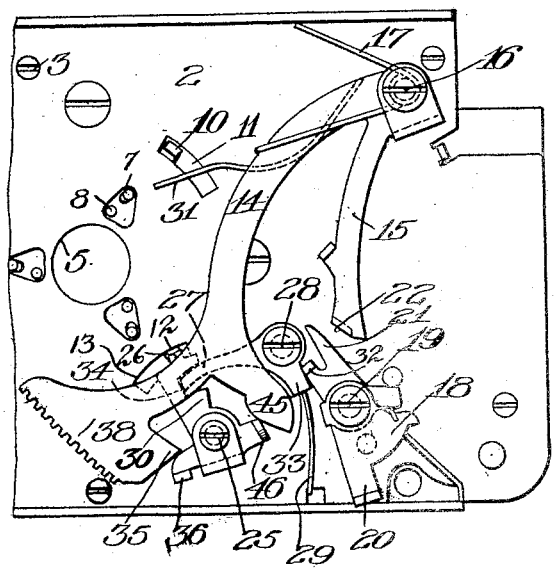
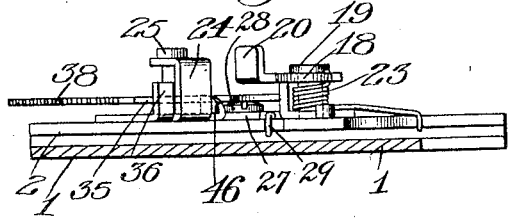
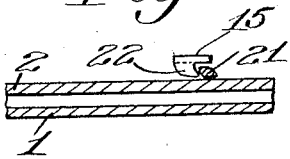

P. J. MARKS.
PHOTOGRAPHIC SHUTTER.
APPLICATION FILED NOV. 30, 1915.
1,238,422.
Patented Aug. 28, 1917.
3 SHEETS—SHEET 3.
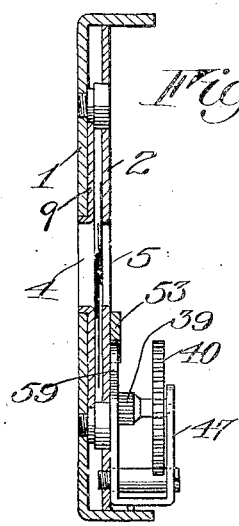
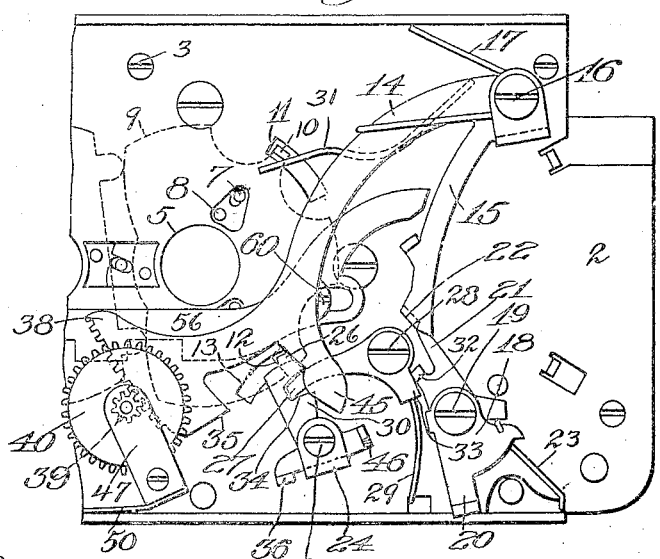
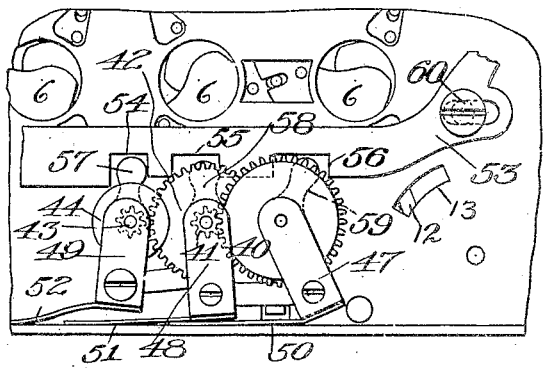
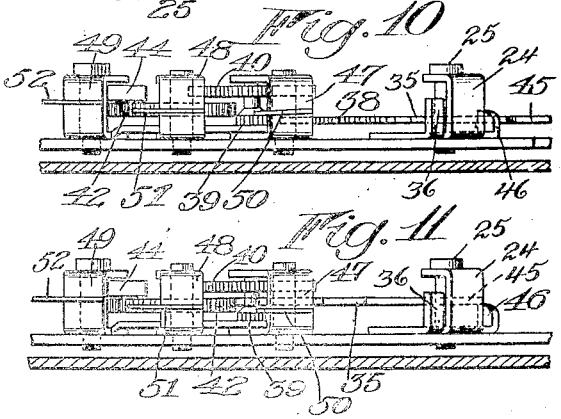
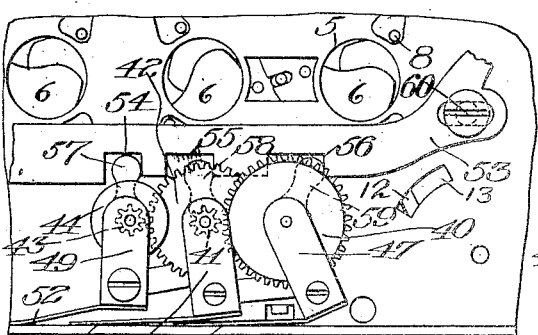
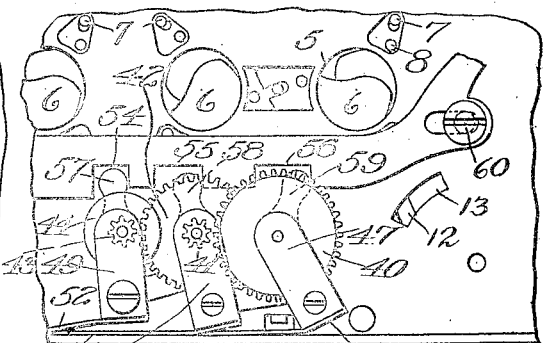
Inventor
Paul J. Marks
Witnesses

UNITED STATES PATENT OFFICE.

PAUL J. MARKS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,238,422.     Specification of Letters Patent.     Patented Aug. 28, 1917.

Application filed November 30, 1915. Serial No. 64,356.

*To all whom it may concern:*

Be it known that I, PAUL J. MARKS, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters and it has for its object to provide a simple and efficient shutter actuating mechanism possessing certain points of novelty and improvement and also to provide, in connection therewith, a simple and efficient retarding mechanism. The improvements are directed in part toward the means provided for locking the shutter blades closed, one object being to render the locking device effective up to the very instant that the shutter actually starts to open and another object of the invention is to improve the conditions under which the master member drives the shutter blades so that one spring will not be acting against another during certain important movements of the parts. To these and other ends the invention resides in certain improvements and combinations of parts all as will be hereinafter more fully described, the novel features being pointed out in the claims at the end of the specification.

In the drawings:

Fig. 3 is a fragmentary view similar to Fig. 1 but showing some parts removed and others in greater detail;

Fig. 4 is a fragmentary view similar to Fig. 3 illustrating the release of the blade locking latch an instant before the blades open;

Fig. 5 is also a fragmentary view with the parts shown in Figs. 3 and 4 in the position assumed while the blades are open;

Fig. 6 is a detail section through the mounting plate taken substantially on the line 6—6 of Fig. 3 and showing elevations of the operating member and blade actuating member;

Fig. 7 is a detail section taken substantially on the line 7—7 of Fig. 3;

Fig. 8 is a detail section taken through the mounting and cover plates substantially on the line 8—8 of Fig. 1;

Fig. 9 is a fragmentary plan view similar to Figs. 3, 4 and 5 showing the position of the parts the instant after the blade latch is released from the position of Fig. 4.

Fig. 10 is a detail section through the mounting plate taken substantially on the line 10—10 of Fig. 1 showing the master member in operative relationship to the retarding device;

Fig. 11 is a view similar to Fig. 10 showing the master member in inoperative position with reference to the retarding device, being a section on the line 11—11 of Fig. 2, and Figs. 12, 13 and 14 are fragmentary plan views showing different adjustments of the retarding device.

Similar reference numerals throughout the several figures indicate the same parts.

Figure 1:
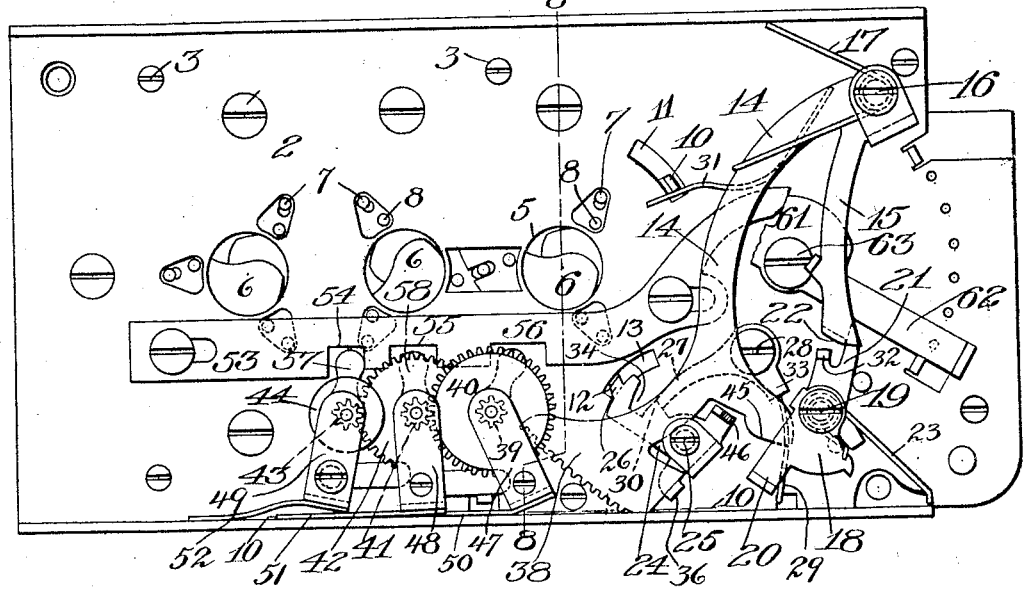
Figure 1 is a plan view of a photographic shutter constructed in accordance with and illustrating one embodiment of my invention, the adjustment being for the most prolonged of the automatically timed exposures.

The particular shutter that I have illustrated as an embodiment of my invention is a multiple aperture shutter designed for making a plurality of simultaneous exposures and involves three distinct blade mechanisms but as the inclusion of one only is material to the present combination, only that one which is directly connected to the actuating mechanism will be featured in the description. In this view, the shutter comprises a mounting plate 1 and a cover plate 2 (Figs. 1 and 8) held together in spaced relationship by screws 3 and provided with registering shutter apertures 4 and 5. The blades 6 normally closing the aperture are confined between the two plates and are turned on fixed pivots 7 to open and close through the medium of pivotally connected pins 8 on a blade ring 9 shown in dotted lines in Fig. 3. This blade ring has an angle arm 10 thereon extending through a slot 11 in the cover plate 2 while at another point it is provided with an opening 12 beneath a slot 13. These two constitute separate points at which the ring becomes accessible for the coöperation of the actuating mechanism hereinafter described.

The master member as here presented is in the form of a vibratory lever having two relatively fixed arms 14 and 15 pivoted at 16 under the control of a spring 17 that normally tends to urge it to the position of Figs. 1 and 3 which is its normal position. The shutter operating member is constituted by a lever 18 pivoted at 19. The arm 20 of this lever is the operating arm corresponding to the finger portion while the other arm 21 engages a downwardly turned shoulder 22 on the arm 15 of the master member. When the operating lever is moved to the right against the tension of its own spring 23, the arm 21 rocks the master member to the left through the engagement at 22 as shown in Fig. 4 and finally slips off of the shoulder 22, as shown in Fig. 5, allowing the master member to return to normal position. As the operating member is released and allowed to return to its normal position, it rides under a cam face on the shoulder 22, as shown in Fig. 7, and reassumes its operative relationship thereto.

Figure 2:
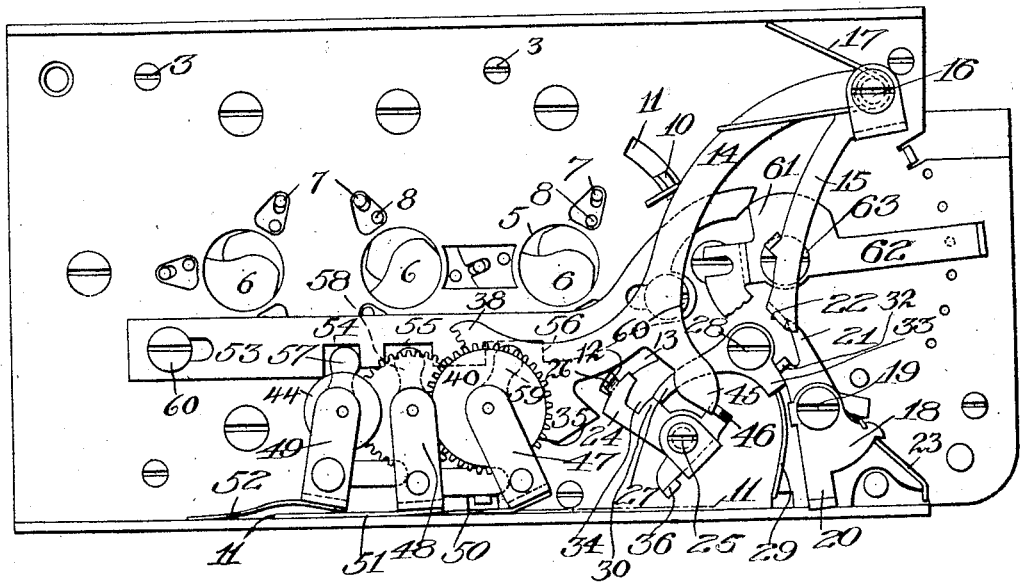
Fig. 2 is a similar view showing the parts in a certain position assumed during the operation of the shutter before the blades have been opened.

A blade actuating member 24 is pivoted at 25 and is provided with an inwardly turned ear 26 that extends through the slot 13 in the cover plate and engages the opening 12 in the blade ring 9 to turn the latter in either direction. As the actuating member moves to the right in the figures, it opens the blades, and as it moves to the left, it closes them. It is normally held in the extreme of the last mentioned position by a latch 27 pivoted at 28 under the influence of a spring 29 that seeks to hold the latch in engagement with the shoulder 30 on the actuating member. As the master member is moved to the left under the influence of the operating member 18, a spring arm 31 carried by the arm 14, which spring arm is normally inert, is placed under tension and is in engagement with the arm 10 on the blade ring, as shown in Fig. 4, in which figure the latch 27 is shown to be still in operative position and in Fig. 2 also. As the arm 21 of the operating member immediately thereafter slips from engagement with the shoulder 22 on the master member, a shoulder 32 on said arm comes into engagement with an arm 33 on the latch and trips it, as shown in Fig. 9, allowing the spring arm 31 to rotate the blade ring and open the blades.

As the blades open, the ring 9 carries the actuating member 24 to the right, the point of the disengaged latch 27 being taken into a recess 34. When the master member returns as it immediately does under the influence of its spring 17, a shoulder 35 thereon comes into contact with an abutment 36 on the actuating member 24 and rocks the latter to the left again closing the blades. During this movement, the spring arm 31 recedes before the arm 10 on the blade ring but anyway, the spring of the master member is stronger than the spring 31. The operating member 18 having meanwhile been released, as the other parts reassume their normal positions, the latch 27 also goes back into engagement at 30 and the blades are positively locked in closed position.

The actuation of the shutter, including opening and closing, as just described would, with only the parts mentioned, produce only an instantaneous exposure or one of the very shortest automatically timed exposures, the duration of which would be in proportion to the strength of the spring 17 of the master member. For automatically timing exposures of longer duration, I employ a retarding device that impedes the return of the master member and slows up the rate of its travel so that its engagement at 35 with the abutment 36 on the actuator 24 is delayed. To this end, the arm 14 of the master member terminates in a toothed segment 38 that meshes on the down or closing stroke with a small gear 39 fixed to the shaft of a large gear 40. This last mentioned gear meshes with a small gear 41 on the shaft of a second large gear 42 which in turn meshes with a small gear 43 on the shaft of a fly wheel 44, the whole constituting a gear train. The frictional resistance and inertia of this train must be overcome by the master member and its spring 17 and its progress is slowed up according to the size and effectiveness of the train.

In order that the master member may not be impeded by the train during its setting movement while the springs 17 and 31 are being placed under tension by the operating member, the segment 38 is caused to clear the gear 39 on its back stroke. The said gear is narrow occupying only a part of the shaft of the large gear 40, as shown in Figs. 10 and 11, and the segment 38 is in the same plane therewith, as shown in Fig. 10, only on the down stroke. On the upstroke during the setting of the master member, a tongue 45 on the latter rides upon a cam 46 carried by the actuator 24 on the opposite side of the pivot from the abutment 36, as also shown in Fig. 6 and this raises the segment as shown in Fig. 11, so that it clears the gear 39 and does not reassume its position in a plane therewith until the master member is fully set and the tongue 45 has dropped off of the cam 46. The opening of the blades by the spring 31 rocks the actuator as previously described and carries the cam 46 to a position in which the tongue 45 on the master member may clear it on the way back, as shown in Fig. 9 and in Fig. 5, before the shoulder 35 on the master member returns the actuator with the closing of the blades to a position in which the cam is again in operative position as in Figs. 1 and 3.

To vary the retarding action on the master member and obtain exposures of different durations, the resistance of the retarding train may be varied in the following manner:

The gears 39—40, 41—42 and 43—44 are carried upon swinging yokes 47, 48 and 49, respectively. The yoke 47 has a spring 50 that normally holds the gear 39 in position for meshing with the segment 38 and the yokes 48 and 49 are similarly provided with springs 51 and 52 holding them in gear with each other and with the gear 40. When all are geared together in this way, as in Fig. 1, the maximum resistance is provided and an exposure of the longest automatically timed duration will result. For the next shorter exposure the fly wheel 44 is thrown out, as in Fig. 12; then the gear 42, as shown in Fig. 13, and finally all of the gears as shown in Fig. 14.

Such shifting of the gears is accomplished in the present instance by means of a slide bar 53 having shoulders 54, 55 and 56 thereon. These shoulders are so spaced that as the slide bar is thrust to the left, they will progressively pick up arms 57, 58 and 59 in the order named, which arms are attached, respectively, to the yokes 49, 48 and 47, and rock them and the yokes to the left carrying the respective gears out of mesh. The slide bar is guided upon pins 60 and may be operated against the tensions of the springs 50, 51 and 52 by a cam engagement at 61 with a lever 62 pivoted at 63 and having the form of the ordinary time setting lever.

It will be noted that the blades are positively locked in closed position up to the very instant the shutter opens, as illustrated in Fig. 4. The usual blade closing spring is not employed and hence during the travel of the master member to open the shutter through the medium of the spring 31, there is no spring to overcome, giving a very quick opening movement while the return of the master member is not impeded by anything other than the selected resistance from the retarding device.

I claim as my invention:

1. In a photographic shutter, the combination with a blade mechanism, of a spring operatively connected with the blades and a master member adapted to actuate the blades in one direction through the medium of the spring and to positively actuate them in the other direction.

2. In a photographic shutter, the combination with a blade mechanism, of a spring, a master member arranged to open the blades through the medium of the spring and to positively close them, and locking means normally holding the blades closed.

3. In a photographic shutter, the combination with a blade mechanism, of actuating mechanism embodying a spring for opening the blades and means for positively closing them, a latch for locking the blades closed and means for placing the spring under tension and then releasing the latch.

4. In a photographic shutter, the combination with a blade mechanism, of a spring, normally inert, for opening the blades, a latch for holding them closed and a master member movable in one direction to place the spring under tension and in the other to positively close the blades after the latch is released.

5. In a photographic shutter, the combination with a blade mechanism, of a normally inert spring for opening the blades and a spring actuated master member for closing the blades arranged to place the blade opening spring under tension during its setting movement.

6. In a photographic shutter, the combination with a blade mechanism, of a spring, a master member for opening the blades through the medium of the spring, a latch for locking the blades closed and an operating member adapted to engage the master member to set the same and to then slip from such engagement and engage and release the latch.

7. In a photographic shutter, the combination with a blade mechanism and an actuator connected therewith, of a latch coöperating with the actuator to lock the blades closed and means under the control of the latch for opening the blades and adapted to engage the actuator to close them.

8. In a photographic shutter, the combination with a blade mechanism and an actuator connected therewith, of a spring for opening the blades, a latch coöperating with the actuator to lock the blades closed, a master member adapted to place the opening spring under tension during its setting movement and to close the blades by engagement with the actuator and an operating member for setting and releasing the master member and releasing the latch in the order named.

9. In a photographic shutter, the combination with a blade mechanism and an oscillatory actuator having one arm connected to the blade mechanism, of a spring for opening the blades, a latch coöperating with the actuator to lock the blades closed, a spring actuated master member adapted to place the opening spring under tension during its setting movement and to engage the other arm of the actuator and close the blades when released and an operating member adapted to successively set the master member and release the latch.

10. In a photographic shutter, the combination with a blade mechanism, of a tension member for opening the blades, means for positively closing them and a latch normally locking the blades closed.

11. In a photographic shutter, the combination with a blade mechanism and a spring for opening the blades, of a master member and an actuating spring therefor, said master member being movable to close the blades under the joint tension of its actuating spring and the blade opening spring.

12. In a photographic shutter, the combination with a blade mechanism, a master member for closing the blades, and an actuating spring therefor, of a spring for opening the blades placed under tension by the setting movement of the master member.

13. In a photographic shutter, the combination with a blade mechanism, of a master member having a resilient arm for opening the blades and a rigid arm for closing them and a latch for locking the blades closed while the master member is being set.

14. In a photographic shutter, the combination with blade mechanism and retarding mechanism embodying a gear, of blade actuating mechanism embodying a segment adapted to mesh with the gear upon one stroke of the actuating mechanism and means independent of the gear and retarding mechanism for deflecting the segment to allow it to return out of mesh with the gear as the actuating mechanism is reset.

15. In a photographic shutter, the combination with blade mechanism and retarding mechanism embodying a gear, of blade actuating mechanism embodying a master member movable in one direction to open the shutter and in the other to close it, said master member being provided with a segment meshing with the gear during said last mentioned movement, and means for holding the segment out of mesh with the gear during said first mentioned opening movement.

16. In a photographic shutter, the combination with a blade mechanism, a master member having a toothed segment, an actuator for the blades operated by the master member and a retarding means embodying a gear driven by the segment on the master member when the latter is operated in one direction, of a cam on the actuator for deflecting the master member as the latter is operated in the other direction to cause the segment to return out of mesh with the gear.

PAUL J. MARKS.

Witnesses:
FRANK M. PAGE,
EDITH WATERSTRAAT.